United States Patent [19]

Medlock

[11] Patent Number: 4,509,394
[45] Date of Patent: Apr. 9, 1985

[54] RADIATOR FILLER NECK REFACING TOOL

[76] Inventor: Dan Medlock, 1209 E. Main St., Richmond, Ky. 40475

[21] Appl. No.: 486,734

[22] Filed: Apr. 20, 1983

[51] Int. Cl.³ .............................................. B23B 5/00
[52] U.S. Cl. ..................................................... 82/4 R
[58] Field of Search ....................... 82/4 R, 1 A, 2 A; 408/72 R, 80, 82, 93, 101, 102; 30/172

[56] References Cited

U.S. PATENT DOCUMENTS

| | | | |
|---|---|---|---|
| 1,526,950 | 2/1925 | Bartley | 82/4 R |
| 1,747,944 | 2/1930 | Lyne | 82/4 R |
| 3,266,345 | 8/1966 | Weisner et al. | 82/4 R |
| 3,350,964 | 11/1967 | Brooks | 82/4 R |

FOREIGN PATENT DOCUMENTS 721826  6/1942  Fed. Rep. of Germany ....... 82/4 R

*Primary Examiner*—Leonidas Vlachos

[57] ABSTRACT

This tool is used to reface the filler necks of the radiators of coolant systems of Caterpillar equipment. Primarily, it includes a circular plate, having a number of radial cutting blades secured to it. It also includes a sleeve, for being received on the stud within the filler neck, and it further includes bolts for receiving a wrench to rotate the tool, and a depth control bolt is included, for adjusting the depth of cut of the blades of the device.

1 Claim, 6 Drawing Figures

RADIATOR FILLER NECK REFACING TOOL

This invention relates to cutting tools, and more particularly, to a radiator filler neck refacing tool.

The principal object of this invention is to provide a radiator filler neck refacing tool, which will be employed to reface or refinish industrial radiator filler necks that become pitted, where the radiator cap contacts the filler neck to seal an engine's coolant system.

Another object of this invention is to provide a radiator filler neck refacing tool, which will be manually operated, to refinish radiator filler necks quickly and effectively, because pitted filler necks inhibit proper sealing, and enable coolants to escape, and cause the loss of the proper pressure, that is necessary to keep the engine running at the proper operating temperature.

A further object of this invention is to provide a radiator filler neck refacing tool, which will eliminate undue maintenance of the cooling system caused by overheating.

Other objects are to provide a radiator filler neck refacing tool, which is simple in design, inexpensive to manufacture, rugged in construction, easy to use, and efficient in operation.

These, and other objects, will be readily evident, upon a study of the following specification, and the accompanying drawing, wherein.

Figure 1:
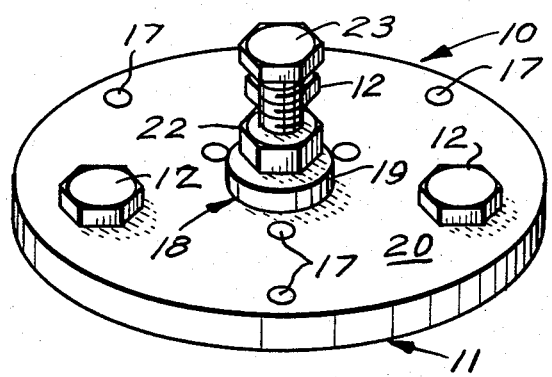
FIG. 1 is a top perspective view of the present invention.
Figure 2:
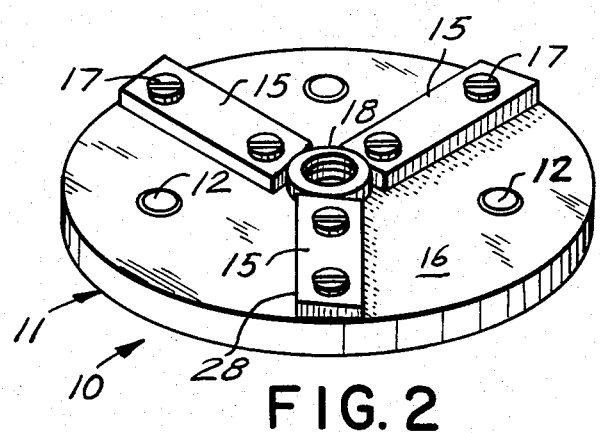
FIG. 2 is a bottom perspective view of FIG. 1.
Figure 3:
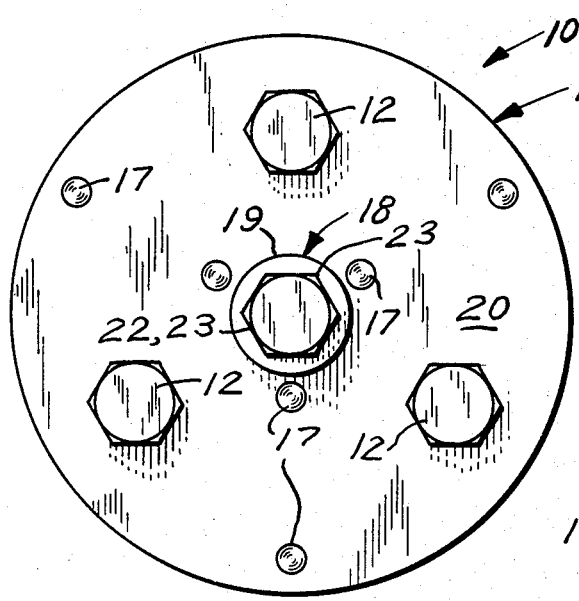
FIG. 3 is a top plan view of FIG. 1.
Figure 4:
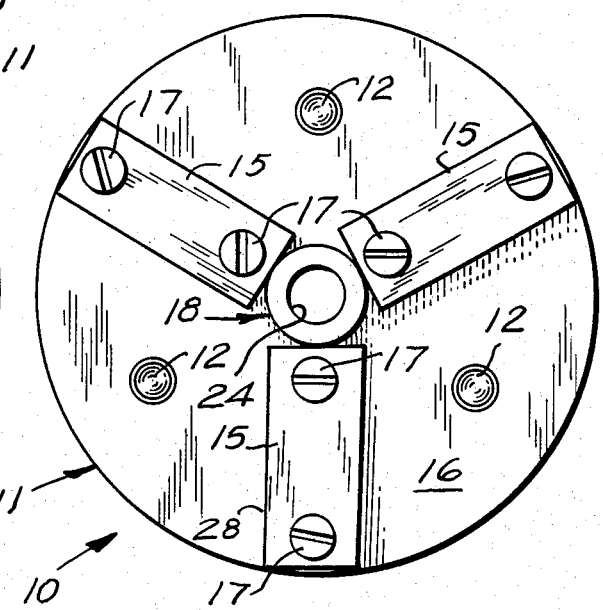
FIG. 4 is a bottom plan view of FIG. 1.
Figure 5:
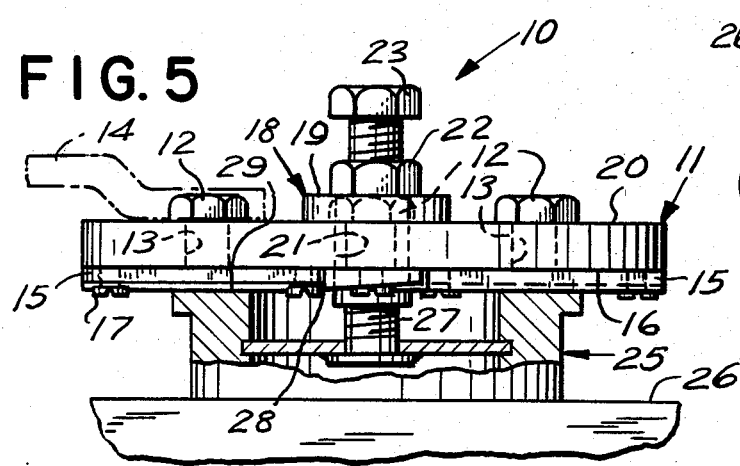
FIG. 5 is a side view of FIG. 1, showing the device in place on a radiator filler neck, which is shown partly broken away and in elevation, and a fragmentary wrench is shown in phantom lines.
Figure 6:
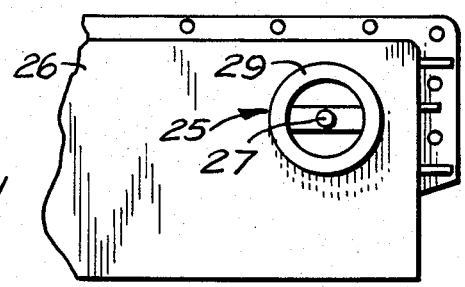
FIG. 6 is a fragmentary top plan view of a radiator, which is serviced by the present invention.

Accordingly, a tool 10 is shown to include flat and circular main body or head 11, having three equally and radially spaced-apart studs 12, which are threaded into internally threaded openings 13, so as to receive a wrench 14, that is used to rotate main body 11 in a clockwise direction. A total of three equally and radially spaced-apart cutting tools 15 are secured to the bottom face 16 of main body 11, by a plurality of screw fasteners 17, and a cutting tool guide sleeve 18 includes a flange 19, which shoulders against the top face 20 of main body 11. Guide sleeve 18 is received in the central opening 21 of main body 11, and includes a hexagonal head 22, for use in adjusting tool 10, which hereinafter will be described. A cutting depth control bolt 23 is threadably received in the internally threaded bore 24 of sleeve 18, so as to elevate and lower tool 10 on filler neck 25 of radiator 26, as desired.

In use, tool 10 is placed on top of the filler neck 25, with the stud 27 of the filler neck 25, within the bore 24. As the tool 10 is rotated in a clockwise direction, the cutting edges 28 reface the surface 29 of the filler neck 25. A wrench is placed on the bolt 23 and is rotated clockwise, or counterclockwise to control the depth of cut of blades 15 on the surface 29 of filler neck 25.

While various changes may be made in the detail construction, it is understood that such changes will be within the spirit and scope of the present invention, as is defined by the appended claims.

I claim:

1. A radiator filler neck refacing tool, comprising, in combination, a flat, circular main body, a guide sleeve fitted through a central opening in said main body, a flange around an intermediate portion of said sleeve being shouldered against an upper side of said main body, a hexagonal head formed around an upper end of said sleeve, a threaded central opening extending axially through said sleeve, a cutting depth control bolt engaged in an upper portion of said threaded opening for elevating or lowering said tool on said neck, a lower portion of said threaded opening being engagable by a stud mounted on a radiator filler neck for securing said tool upon said neck, a plurality of radially extending cutting members mounted on an underside of said main body for placement upon the face of a top end of said radiator filler neck, and wrench-engaging means upon an upper side of said main body for turning said tool, and causing cutting edges of said cutting members to reface said top end face.

* * * * *